United States Patent

[11] 3,596,208

[72] Inventor David Lessing Yerzley
Pittsburgh, Pa.

[21] Appl No. 839,978
[22] Filed July 8, 1969
[45] Patented July 27, 1971
[73] Assignee RCA Corporation

[54] SAWTOOTH FREQUENCY MODULATION SYSTEM INCLUDING A WAVESHAPING FREQUENCY MULTIPLIER CHAIN
10 Claims, 4 Drawing Figs.

[52] U.S. Cl. .......... 332/9 R, 328/36, 332/22
[51] Int. Cl. .......... H03c 3/00
[50] Field of Search .......... 332/9, 16, 91, 161, 22, 23; 328/36; 325/30, 163; 178/66; 307/321

[56] References Cited

UNITED STATES PATENTS

| | | | |
|---|---|---|---|
| 2,566,826 | 9/1951 | Day | 332/9 |
| 2,730,676 | 1/1956 | Barker | 307/321 X |
| 3,111,633 | 11/1963 | Day | 332/9 X |
| 3,262,069 | 7/1966 | Stella | 328/36 X |

*Primary Examiner*—Alfred L. Brody
*Attorney*—Edward J. Norton

ABSTRACT: A modulation system includes a serrasoid modulator to provide a relatively high phase-shift capability and a broadband, uptuned frequency multiplier chain to achieve the required amount of frequency deviation when operating at the commercial broadcasting frequencies.

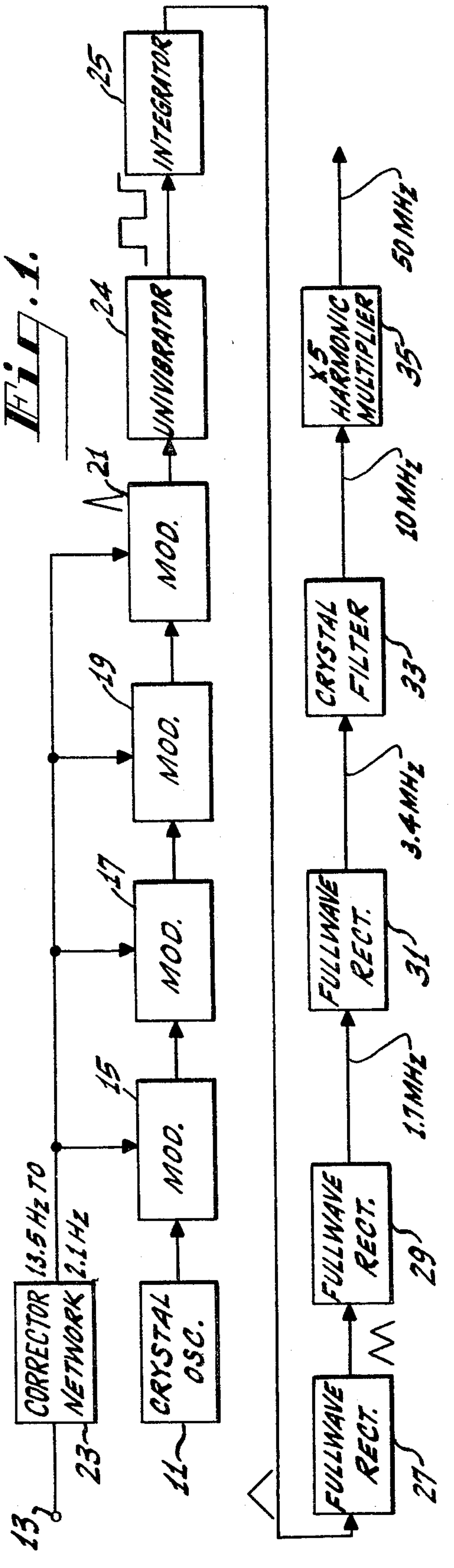
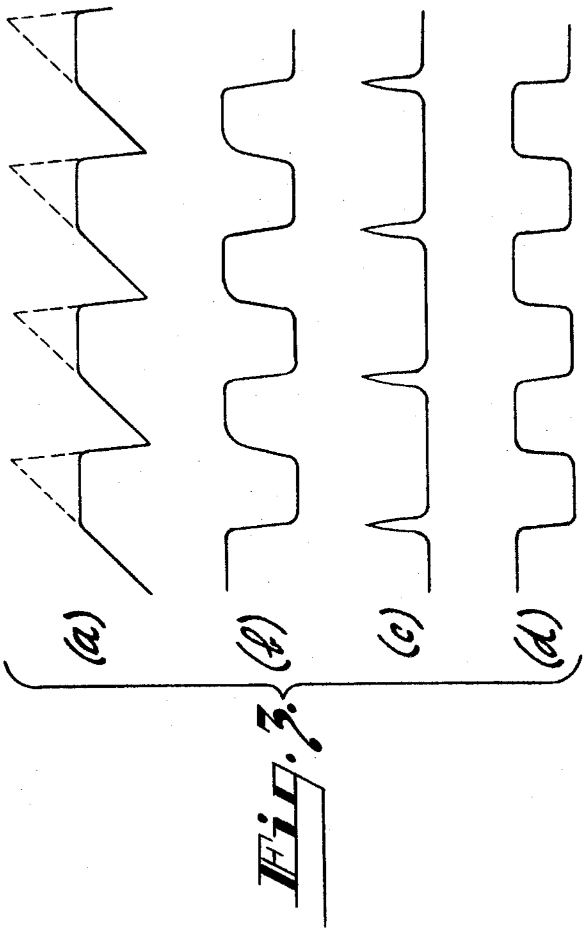
INVENTOR.
DAVID LESSING YERZLEY
BY Robert L. Troike
Attorney INVENTOR.
DAVID LESSING YERZLEY
BY Robert L. Troike
Attorney

SAWTOOTH FREQUENCY MODULATION SYSTEM INCLUDING A WAVESHAPING FREQUENCY MULTIPLIER CHAIN

This invention relates to modulation systems and more particularly to a frequency or phase modulation system stable enough for broadcast service.

The need for a simple frequency modulation system employing no automatic frequency control (AFC) loop nor many of the tuning adjustments found in such systems is highly desirable. A phase shift-type of modulator where modulation of frequency is obtained by varying the phase of a frequency stabilized wave is best suited for this application. The frequency is deviated from its controlled value only during the time the phase is changing, and the frequency deviation is proportional to the rate of change of phase. A particular type of phase-shift modulator usable in such applications is the serrasoid because of its stability, its relatively high phase-shift capability and simplicity. The drawback associated with such a phase modulation system is the long multiplier chain required to raise the phase-shift to the value required to produce the required amount of frequency deviation.

Cascading of many stages to obtain the required amount of frequency deviation is costly and consumes much power. Customarily this multiplication has been achieved with double, triple, and in some cases, quadruple tuned circuits. The large number required and the difficulty involved in tuning effectively offsets the advantages gained by the use of a phase-shift modulator, or in particular, a serrasoid system.

It is an object of the present invention to provide an improved modulation system which is simple, reliable and which requires neither the AFC loop nor the many tuning adjustments as in prior art frequency or phase modulation systems.

SUMMARY OF THE INVENTION

Briefly, this and other objects of the invention are provided by the combination of a phase-shift-type of modulator which provides variable time spaced pulses with a multiplier chain. The multiplier chain in response to the time spaced pulses provides a square wave output which is then integrated to produce a symmetrical, triangular wave. This triangular wave is then multiplied to achieve a desired amount of frequency deviation.

A more detailed description follows in conjunction with the following drawings wherein:

FIG. 1 is a block diagram of one embodiment of the invention,

FIG. 3 is a set of waveforms illustrating the operation of the modulator described in connection with FIG. 1.

Figure 4:
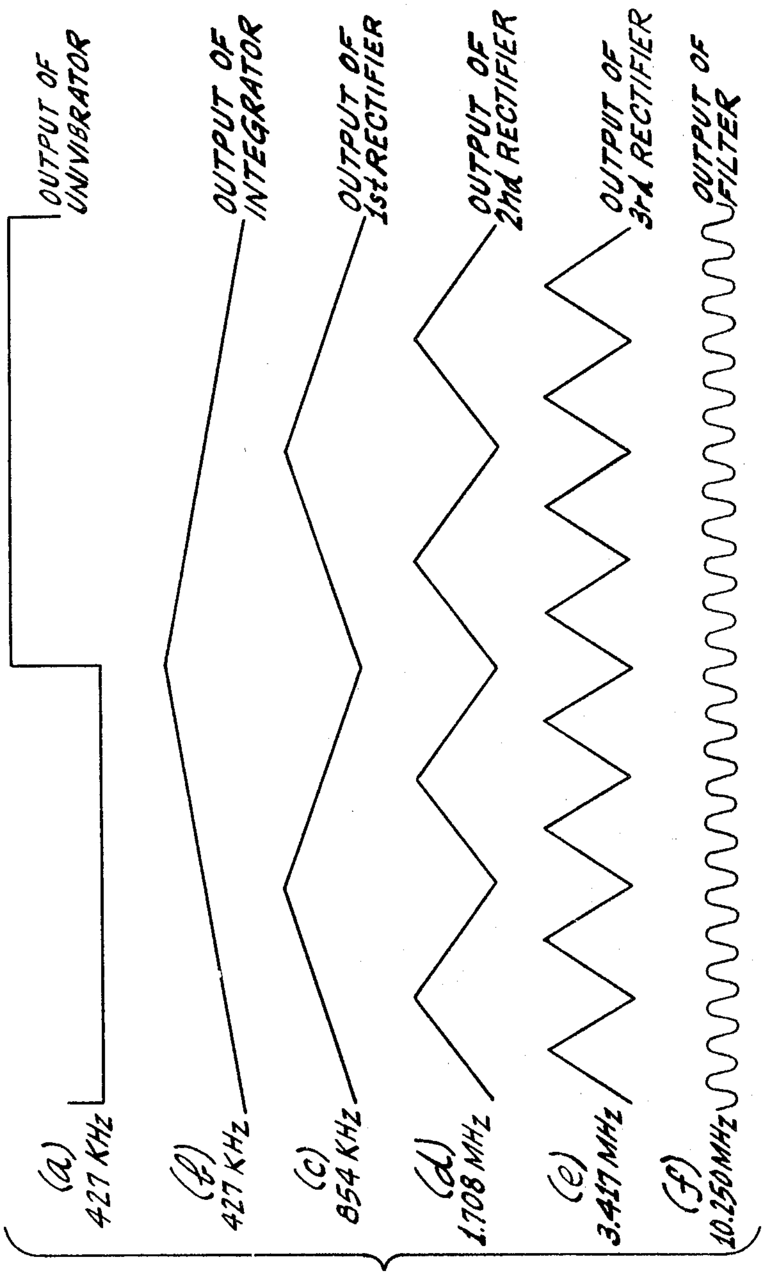
FIG. 4 is a set of waveforms useful in describing the operation of the multiplier chain of the system in FIG. 1.

Referring now to FIG. 1, there is shown a block diagram of a frequency modulation system in accordance with the present invention. In this arrangement, a fixed frequency signal wave provided by a crystal controlled oscillator 11 is applied to a series of modulators 15, 17, 19 and 21. An audio signal coupled at terminal 13 is applied to each of the cascaded modulators 15, 17, 19 and 21 through a corrector network 23. Corrector network 23 provides the dual function of preemphasis and correction by providing as an output a 6 db. per octave fall in the output of the network only in the frequency region of 13.5 $H_z$ to 2.1 k$H_z$. These particular values are selected for FCC (Federal Communication Commission) standard 75 microsecond preemphasis. Other frequency regions would be applicable for other standards. This corrector is accomplished herein by a simple RC network as shown in FIG. 2.

Figure 2:
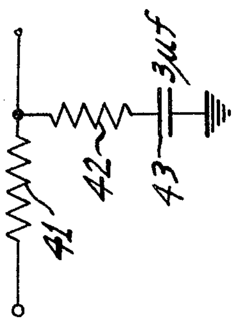
FIG. 2 is a schematic diagram of the corrector network shown in FIG. 1.

In the RC network shown in FIG. 2, the resistor values 41 and 42 and 3.9 kilohms and 25.0 ohms, respectively, and capacitor 43 is a 3 microfarad capacitor. This arrangement provides a high frequency knee at 2100 $H_z$ and a low frequency knee at 13.5 $H_z$ with a 6 db. per octave attenuation between 13.5 and 2100 $H_z$. The modulators 15, 17, 19 and 21 are sometimes referred to as serrasoid modulators and are like that described, for example, by Day in U.S. Pat No. 2,566,826 issued Sept. 4, 1951. In this type of modulator arrangement, the oscillator input signal is converted to a sawtooth wave with each wave being shaped to comprise a truncated sawtooth voltage wave with the peaks clipped in the manner shown in curve (*a*) of FIG. 3. In the modulator the sawtooth wave is converted to a rectangular wave as shown in curve (*b*) of Fig. 3. The amplitude of the modulating signal (audio in this case) from the correction network 23, causes a change in the width of the top portion of the wave. A differentiating circuit in the modulator converts the variable width rectangular wave curve (*b*) to provide as an output from each modulator a series of position modulated pulses dependent on the position of the trailing edge of the rectangular wave as shown in wave (*c*) of FIG. 3.

Frequency deviation is proportional to the rate of change of the phase. For sinusoidal modulation this may be expressed by saying that the peak frequency deviation is equal to the product of the peak phase shift and the modulating frequency. The circuit as described herein provides conservatively about plus or minus 1 radian or $\pm 60°$ as a basis for 100 percent modulation at 50 cycles. For about 1 radian and 50 cycles, the peak deviation therefore will be about $\pm 52$ cycles.

For use in TV-aural service, the system described herein produces the final full-deviation signal at approximately 50 M$H_z$ (MegaHertz) independent of the channel on which the equipment is to operate. The 50 M$H_z$ signal is then heterodyned to the desired final operating frequency. Thus it is necessary to produce 100 percent modulation at 50M$H_z$.

Since it is desirable to use 100 percent modulation in TV-aural broadcasting in the range of, for example, 50 MegaHertz, a long multiplier chain is normally required to raise the phase-shift to the value required to reach the required amount of deviation. In the arrangement shown in FIG. 1, four modulators 15, 17, 19 and 21 are placed in cascade to raise the frequency to 400 k$H_z$. The modulators 15, 17, 19 and 21 are like that described above where each modulator provides about 52 Hertz deviation for 100 percent modulation. The cascading four such modulators provide 208 Hertz deviation which when multiplied by 120 in the multiplier chain to follow provides 25 k$H_z$ deviation at the frequency of 50 M$H_z$. In the cascade arrangement of the modulators the output of the previous modulating state (the narrow pulse position output pulses) is employed to generate another sawtooth which is then phase modulated to the extent of the modulating signal as described above and further by Day cited above. To derive the additional necessary frequency, the multiplication required is customarily done with double, triple, and in some cases, quadruple tuned circuits to multiply the signal to produce a reasonable amount of frequency deviation. This arrangement results in difficulty in tuning due to the large number of tune circuits involved which then offsets the advantages gained in the system by this type of modulation technique.

In the critical multiplying area, in the described example, from 400 k$H_z$ to 10 M$H_z$ there is located a multiplier chain which uses digital and wave shaping techniques and requires only one adjustment to optimize performance. In the arrangement described herein, the output pulses, waveform (*c*) of FIG. 3, from the modulators 15, 17 19, 21 trigger a conventional univibrator or monostable multivibrator 24 to produce a square wave as shown in the waveform (*d*) of FIG. 3 and waveform (*a*) of FIG. 4 which is in turn integrated by integrator circuit 25 to form a triangle wave as shown in wave (*b*) of FIG. 4. The particular square wave generator may be any of the well known circuits, including flip-flop circuits. To provide the symmetrical triangle wave, it is important that the square wave generator circuit selected be stable. The integrator 25, by means of a high pass filter following the integrator or by the circuit arrangement of the integrator, is arranged so that it effectively integrates only those signals which are above the normal audio frequency, such as above 400 kc, for example. This is necessary because otherwise the integrator, which is a low-pass configuration would act as an FM detector to the constant area pulses controlled by the FM signal. This audio component would be fed to the full-wave rectifier to follow, unbalancing the full-wave rectifier and thus producing severe distortion. A single tuning adjustment may be placed at the univibrator for maintaining the desired symmetrical triangle by adjusting the pulse width of the output. The symmetrical triangle wave is then applied to three cascading full-wave rectifiers. Each rectifier 27, 29 and 31 includes an amplifier for doubling the amplitude of the triangle waves. The first full-wave rectifier circuit 27 produces in response to the symmetrical triangular wave an output triangular wave with twice the number of triangle waves per given time by the fold over action of a typical full-wave rectifier than that applied thereto, see waveform (*c*) of FIG. 4. Thus each rectifier circuit acts as a doubler.

The second full-wave rectifier circuit 27 is both an amplifier and folded over circuit or full-wave rectifier circuit to provide as an output twice the number of triangle waves per given time period as that applied thereto to provide a waveform (*d*) as shown in FIG. 4. By the use of a third similar full-wave rectifier 31 including an amplifier stage, the output frequency is again doubled to provide a waveform (*e*) with twice the number of triangle waves per given time period. In this manner the frequency is raised in the example from approximately 400 $kH_z$ to approximately 3 $MH_z$. The output from the full-wave rectifier 31, in the example illustrated, is then applied to a crystal filter circuit 33. The crystal filter circuit 33 has a center frequency of 10 $MH_z$ which reflects the fundamental and all harmonics, except the third, thus providing in addition to frequency selectivity an extra multiplication factor of three. The crystal filter also serves to eliminate any spurious frequencies produced in the frequency multiplication process which preceeds it. For purposes of tuning the multiplier chain described, the only tuning adjustment is an adjustment in the pulse width at the univibrator 24. One may read the output of the integrator and tune the univibrator to produce both a perfectly symmetrical triangle as well as to minimize the high frequency audio distortion of the FM signal. The output of the crystal filter 31 is shown as coupled to a single harmonic multiplier 35 which is used to provide a harmonic multiplication of five times and thus raise the frequency from 10 $MH_z$ to 50 $MH_z$ at the output. The fractional bandwidth in the area between 10 $MH_z$ and 50 $MH_z$ is such that single tuned circuits can be used to provide an adequate response. Thus, by combining serrasoid modulators with untuned, broadband frequency multipliers provided in the manner described, a greatly simplified modulation system is obtained while retaining performance comparable to that of high quality direct frequency modulation systems.

What I claim is:

1. A generator of frequency modulated signals comprising:
means responsive to modulating signals to provide a succession of pulses whose time spacing varies in accordance with the modulating signals,
means responsive to said varying time spaced pulses to provide an in-phase square wave output in response to said varying time spaced pulses,
means responsive to said square wave for integrating said square wave to provide a symmetrical triangular wave at a first frequency, and
means responsive to said triangular wave at said first frequency for providing at the output a triangular wave whose frequency is a multiple of said first frequency.

2. The combination as claimed in claim 1 wherein said last-mentioned means includes at least one full-wave rectifier circuit.

3. The combination as claimed in claim 1 wherein said last-mentioned means includes a series of cascaded full-wave rectifier circuits.

4. A generator of frequency modulated signals comprising in combination:
a source of sawtooth waves of substantially constant frequency,
a source of modulating signals,
at least one wave shape modifying means responsive to the modulating signals and arranged to convert said sawtooth wave to rectangular waves whose width is directly proportional to the instantaneous magnitude of said modulating signals, a second wave shape modifying means arranged to convert the rectangular waves to a succession of pulses whose time spacing varies in accordance with the respective widths of the successive rectangular waves,
means responsive to said varying time pulses to provide an in-phase square wave output in response to each of said varying time pulses,
means responsive to said square wave for integrating said square wave to provide a symmetrical triangular wave at a first frequency, and
full-wave rectifying means responsive to said triangular wave for providing at the output a triangular wave whose frequency is a multiple of said first frequency.

5. The combination as claimed in claim 4 wherein the means for integrating integrates only signals above the audio frequency range.

6. The combination as claimed in claim 4 including a corrector network interposed between a source of modulating signals and said wave shaped modifying means to attenuate the components of the modulating potentials in the frequency range from 13.5 $H_z$ to 2.1 $kH_z$.

7. The combination as claimed in claim 4 wherein said full-wave rectifying means includes a series of full-wave rectifiers connected in cascade.

8. The combination as claimed in claim 7 wherein said cascaded full-wave rectifiers operate to provide multiplication within the approximate frequency range below about 30 $MH_z$.

9. The combination as claimed in claim 7 and including a crystal filter responsive to the output of said series of full-wave rectifiers which rejects the fundamental and all harmonics except the third to provide an extra multiplication of said triangular wave output from said rectifier as well as filtering.

10. The combination as claimed in claim 9 above wherein the output of said crystal is applied to a harmonic multiplier.